3,042,155
COMBINATION DISK AND DRUM VEHICLE BRAKING SYSTEM
Oliver K. Kelley, Bloomfield Hills, Mich., assignor to General Motors Corporation, Detroit, Mich., a corporation of Delaware
Filed Nov. 6, 1958, Ser. No. 772,219
1 Claim. (Cl. 188—264)

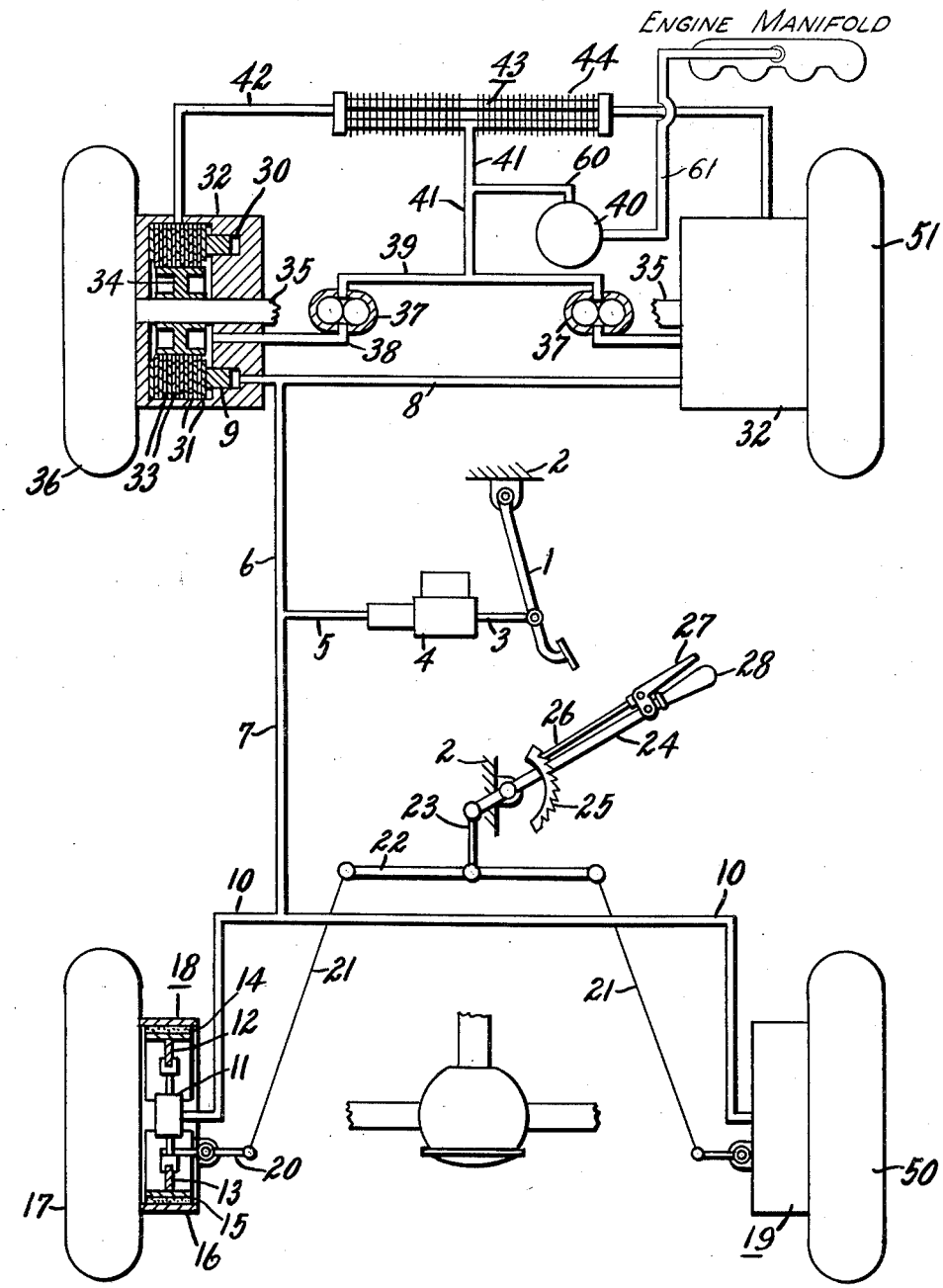

This invention relates to a vehicle braking system, and more particularly to a fluid cooled front disk brake and a vehicle drum rear brake.

With the increased speed and weight of the present day vehicle, a problem is presented in removing the dissipating heat created in the braking structure at the time the vehicle brakes are in operation. This is particularly true of a disk brake. A fluid cooled disk brake has a drag which is created between the brake disks. This is primarily due to the close tolerances between the rotating and stationary disks causing a fluid shear or friction where a cooling fluid is employed for cooling the braking structure.

The conventional vehicle drum brake usually has a mechanical means of operation of the parking brake. This type of a brake has been proven over the years and the simplicity of design is favorable from point of view of economy in manufacture. This type of a brake, however has the disadvantage of relatively rapid wear when a cooling means is not provided for the dissipated heat within the braking structure.

It is an object of this invention to combine a disk and a drum brake on a single vehicle and overcome their inherent disadvantages.

It is an object of this invention to provide a fluid cooled vehicle disk front brake and a conventional vehicle drum brake on the rear in conjunction with a conventional parking brake.

It is another object of this invention to provide a fluid cooled disk brake and a fluid actuated disk brake on the front of the vehicle with a fluid cooling pump responsive to movement of the vehicle. The fluid cooling means is provided with a reservoir and air cooling means on the fluid cooling system. The rear brakes operate in conjunction with a conventional parking brake for holding the vehicle in a stationary position when it is so desired.

It is a further object to provide a fluid cooling system with evacuating means for displacing the fluid from the fluid cooling pumps and the vehicle disk brake structure when the vehicle is driven above a certain predetermined speed. The rear brakes are actuated in conjunction with the fluid actuated disk front brakes.

It is a further object of this invention to employ brake shoes of the rear drum brakes which are provided with a friction material which has a rapidly decreasing coefficient of friction with an increasing temperature of the friction material. The friction material used within this drum brake also has a quick recovery of the coefficient friction upon cooling of the friction material.

It is a further object of this invention to provide a braking structure wherein the braking effort is transferred from the rear wheel brakes to the front wheel brakes upon heating of the rear braking structure. It is also an object of this invention to provide a brake for transferring the brake effort from the front brakes to the rear brakes upon cooling of the friction material within the rear braking structure.

The objects of this invention are accomplished by means of a fluid cooled fluid actuating vehicle disk brake operating on the front end of the vehicle. The cooling system is provided with a cooling pump which operates directly from the rotation of the front wheels. An evacuating means is also provided which is connected to the fluid cooling system and provides for evacuation of the pumping means and the braking means of the front wheels when the vehicle is operating above predetermined speed.

A control means is provided for operating a fluid displacement member which actuates the front wheel disk brakes and also the rear wheel drum brakes. The rear wheel drum brakes are structurally of the conventional drum brake type but utilizing a frictional material which has a quick fade characteristic upon heating of the friction material within the braking structure. This rear brake structure uses a conventional parking brake in conjunction with this type of a conventional brake.

By employing a fluid cooled disk brake on the front of the vehicle and a quick fade characteristic friction material in the conventional drum brake on the rear brakes, the heat dissipated in braking of the vehicle is radiated to the atmosphere through radiating fins on a reservoir within the fluid cooling system for the front wheel brakes only. This provides for a long life of the front disk brakes because they are maintained in a cool operating condition and the rear brakes lose their effectiveness and therefore dissipate considerable less heat as they begin to increase in temperature. This type of braking system also utilizes a conventional parking brake means which has been proven over the years to be a satisfactory parking brake. It eliminates the possible disadvantage of employing a parking brake using disk type brake which is subject to creep upon cooling of the brake structure and also due to the fluid which may be present between the rotating and stationary disks.

The evacuating system eliminates the inherent drag characteristic which is present in the disk type of a fluid cooled vehicle disk front brake. The actuation of the front and the rear wheel brakes is by a fluid displacement member connected in the fluid actuating system.

Further objects and advantages of the present invention will be apparent from the following description, reference being had to the accompanying drawing wherein a preferred form of the invention is clearly shown.

The drawing illustrates the braking system and cooling system. The evacuating system is illustrated schematically with the fluid cooling system.

A further description is made in a copending application of the same assignee, Serial No. 772,217, filed November 6, 1958, now Patent No. 2,955,683, and disclosing the evacuating system in detail. FIGURE 3 of the disclosure for the copending application illustrates the evaluating system employed with a two wheel braking system such as that employed in the present patent application.

The rear wheel drum brakes as illustrated in this application may be of any conventional type. The brake which is intended to be employed with this type of a system utilizes two brake shoes expanded radially outward against a rotating drum which is directly connected to the rear wheels of the vehicle. The wheel cylinder is actuated by a fluid displacement member operated by a control lever within the vehicle passenger compartment.

The parking brake is also of a conventional type which may be employed with this type of a vehicle drum brake. The parking brake is used in conjunction only with the rear wheel brakes. The parking brake lever operates cables which are directly connected to levers mounted on the rear braking structure. The levers mounted on the rear braking structure provide for the expanding of the vehicle brake shoes against the rotating drum and thereby creating sufficient friction to lock the brake shoes on the rotating drums.

The parking brake structure which is illustrated in the present application is of the conventional type and for clarification it is pointed out that it could be of the type illustrated in Patent Number 2,554,291. The brake illustrated in this patent is cable operated and pivots a lever extending inboard from the braking structure and expanding the brake shoes radially outward against the rotating brake drum. The illustration in this patent is merely to clarify the general type of parking brake which may be utilized with the braking system in this patent application and the applicant does not wish to limit the structure in the application to that of the structure in the above cited patent.

In the drawing a fluid actuating system is shown whereby a brake pedal 1 is pivotally mounted on the chassis 2 of a motor vehicle. The brake pedal 1 is also pivotally connected to a push rod 3 which operates against a piston of a conventional master cylinder 4. The master cylinder 4 is connected by conduit 5 which in turn is connected to conduits 6 and 7. Conduit 6 extends forward to conduit 8 which feeds into the braking structure for the actuation of an annular hydraulic wheel cylinder 9 which is placed within the front wheel braking structure.

The conduit 7 extends rearward and is connected to a conduit 10 which feeds into the rear wheel cylinder 11 for the actuation of the rear wheel brakes. The wheel hydraulic cylinder 11 expands the brake shoes 12 and 13 outwardly within the braking structure. The brake shoe 12 is provided with a friction material 14 and brake shoe 13 is provided with a friction material 15 for engaging the rear wheel brake drum 16 of the braking structure, the rear wheel braking structure being provided to control the rotating of the wheel 17. The opposite rear wheel brake is indicated by the structure 19 which is similar to the structure 18 but for the opposite rear wheel brake.

The emergency brake or parking brake is actuated by a lever 20 pivotally mounted on the braking structure or rear wheel brake. This lever is pivotally mounted on the braking structure and operated by a cable 21. Cable 21 is actuated by an arm 22 which is directly connected to a link 23. The link 23 is pivotally connected to the lever 24. The parking brake 24 is pivotally mounted on the chassis 2 and is provided with a ratchet means 25. The ratchet 25 is engaged by pawl 26 which is directly connected to bell crank release 27. The bell crank release 27 is pivotally mounted on the parking brake lever 24 adjacent to the handle portion 28 of said lever.

It is pointed out that the friction material 14 and 15 in this braking structure is of a special type. This friction material has a quick fade characteristic and thereby shifts the braking effort forward to the front wheels upon heating from the dissipated energy within the rear wheel brake drum. The friction material has the same reverse characteristics of a quick recovery of coefficient of friction upon cooling of the friction material within the braking structure. This type of a material would have the advantage of a long life in that it would never be operated under high temperatures because the friction would be considerably reduced and the dissipation of heat so small that the cooling of the brake structure would be nearly as rapid as the added dissipation of heat due to braking.

The front wheel brakes are of the fluid cooled and fluid actuated vehicle disk type as illustrated in the drawings. As the fluid is pressurized in the conduit 8 and the actuating chamber 30 adjacent the annular hydraulic wheel cylinder 9, the brake disk stack is compressed. The brake disk stack comprises the stationary disks 31 which are directly connected to the brake housing 32. The rotating disks 33 are alternately mounted between the rotating disks 31 and are connected to the rotating member 34 which is direclty connected to the wheel shaft 35. Wheel shaft 35 being directly connected to the wheel 36. The wheel shaft 35 is also directly connected to fluid cooled pump 37.

A fluid cooling system comprises a conduit 38 which connects the braking structure with the front wheel pump 37. The conduit 39 connects the fluid cooling pump to the radiating chamber 43. The evacuating cylinder 40 is directly connected to the cooling system through conduit 60, and to the engine manifold by conduit 61. Radiating chamber 43 is provided with radiating fins 44. The opposite side of the front wheel braking structure and cooling and actuating system is the same as described in the preceding portion of the specification.

The evacuating cylinder 40 is more clearly illustrated and described in the copending application Serial No. 772,217, filed Nov. 6, 1958, now Patent No. 2,955,683. This evacuating system is employed with the present application to eliminate drag within the fluid cooling pumps and the disk braking structure.

The operation of the braking system is as follows:

As the control lever 1 is actuated by the operator of the vehicle, fluid is displaced within the master cylinder 4 which pressurized the fluid within conduits 5, 6, 7, 8 and 10. With a pressurized fluid in conduit 8 and the actuating chamber 30, the disk stacks of the front wheel brakes are compressed. As the disks engage each other, a braking force is created on the rotating member 34 and also shaft 35 and wheel 36. The heat which is dissipated within the braking structure is carried to an external point from the braking structure in the fluid cooling system. The circulation of the fluid cooling system is created by the fluid cooling pump 37 which is directly connected to the wheel shaft 35. As the fluid passes through conduit 42, it enters the cooling chamber 43 where the heat is radiated by means of the fins 44 to the atmosphere. The fluid continues through the cooling reservoir 43 and then passes through conduit 41 to return through conduit 39 on the input side of the fluid cooling pump. The conduit 41 and 39 are directly connected and provide for a completion of a continuous circuit of the cooling fluid system.

The rear wheel brakes are also actuated upon a fluid displacement in the fluid displacement member 4 and the pressurizing of fluid within the conduit means 5, 7 and 10. The fluid is then pressurized within the hydraulic wheel cylinder 11 thereby expanding the brake shoes 12 and 13 outwardly. As the shoes are expanded outwardly, the friction material 14 and 15 engages the rotating drum 16 and thereby creates a radial force on the rotating drum 16. The rear wheel brakes are not provided with any fluid cooling means such as the front wheel brakes. The friction material 14 and 15 is of such a nature that upon heating of the brake drum and the friction material, the coefficient of friction rapidly decreases. With a decrease in the coefficient of friction the brake effort on the rear wheels 17 and 50 is then transferred to the front wheels 36 and 51. Under these operating conditions, the rear wheel brakes are unlikely to overheat. As the danger of overheating is eliminated, the wear of the friction material will be greatly decreased because heating the friction material rapidly increases the wear of the friction material.

It is further pointed out that although the braking effort is shifted from the rear wheels to the front wheels, the front wheel braking structure is provided with adequate braking means to control the momentum of the motor vehicle. The increased dissipation of heat within the front wheel braking structure is conveyed to radiating reservoir at an external point from the front wheel braking structure. This provides for a cool operating condition for both the rear wheel brakes and the front wheel brakes and thereby provides for a longer life of the friction material of the vehicle brakes.

It is also a known fact that under severe braking conditions, the momentum of the vehicle is thrown forward, thereby automatically placing a greater braking effort on the front wheels. This type of a braking system is constructed so the increased braking effort required by the front wheel brakes is readily controlled by adequate capacity of the front wheel brakes.

The inherent disadvantage of providing an emergency brake with a vehicle disk brake is eliminated. This also avoids any danger of creeping due to fluid between the rotating and stationary disks and also creep due to the cooling of the braking structure after the parking brake has been applied. With the emergency or parking brake on the rear wheels, the operator is assured of a satisfactory parking brake as the braking structure is that of a conventional and proven parking brake.

Upon release of the operating lever 1, the fluid is no longer pressurized within the rear wheel cylinder 11 or the front wheel actuating chamber 30. This releases the brakes and the coefficient of the friction of the friction material 14 and 15 is recovered quickly upon cooling of the vehicle drum brakes. As the friction material in the rear wheel brakes is cooled, the braking effort is again more evenly distributed on all four wheels. If the brakes are operated in this condition, the vehicle operates with an almost even braking effort on all four wheels.

In the event that the vehicle is operated at a high speed, the evacuating cylinder 40 comes into operation. This operation is described in the copending patent application cited above in the specifications. This added feature eliminates the loss of horsepower due to turbulence within fluid cooling pump 37 and the front wheel disk brake. By combining all the features as described in this specification, the applicant has eliminated the disadvantages of the disk type brake and drum brake and utilized the advantages of both types of brakes. The applicant has also increased the braking capacity as well as prolonging the life of both types of braking structures. The parking brake which is employed with this combination of braking elements, is also of a proven type which will provide lasting service.

While the embodiment of the present invention as herein disclosed, constitutes a preferred form, it is to be understood that other forms might be adopted.

What is claimed is as follows:

A vehicle braking means comprising in combination, front vehicle disc brakes including a stator member, at least one stator disc connected to said stator member, a rotor member, at least one rotor disc mounted on said rotor member adjacent to said stator disc, a hydraulic wheel cylinder for actuating said front wheel brakes, a vericle associated with each of said front vehicle brakes, a fluid pump operated by said wheel, a hydraulic fluid cooling system in communication with said pump to provide cooling of said disk brake, rear wheel brakes each including, a brake support member, a brake drum rotatably mounted adjacent said brake support member, brake shoes mounted on said brake support member, a hydraulic wheel cylinder actuating said rear wheel brakes, a hydraulic fluid brake actuating system in communication with said front wheel hydraulic wheel cylinder and said rear hydraulic wheel cylinder for actuating said brakes, a friction material on said brake shoe means of said rear wheel brake characterized by a quick fade and quick recovery of coefficient of friction to provide equal distribution of braking effort for low temperatures of said friction material and transfer of braking effort to the front disc brakes upon heating of said friction material above said low temperature.

References Cited in the file of this patent

UNITED STATES PATENTS

| | | |
|---|---|---|
| 1,741,178 | Wilson | Dec. 31, 1929 |
| 1,826,824 | Reynolds | Oct. 13, 1931 |
| 2,230,411 | Parnell et al. | Feb. 4, 1941 |
| 2,408,430 | Lowey et al. | Oct. 1, 1946 |
| 2,816,630 | Kelley et al. | Dec. 17, 1957 |
| 2,878,903 | Ordorica | Mar. 24, 1959 |
| 2,934,178 | Eaton | Apr. 26, 1960 |

FOREIGN PATENTS

| | | |
|---|---|---|
| 800,217 | Great Britain | Aug. 20, 1958 |